Sept. 12, 1961  JEAN-BAPTISTE CESCAS  2,999,336
PREPARATION OF COATED SEEDS
Filed July 23, 1959
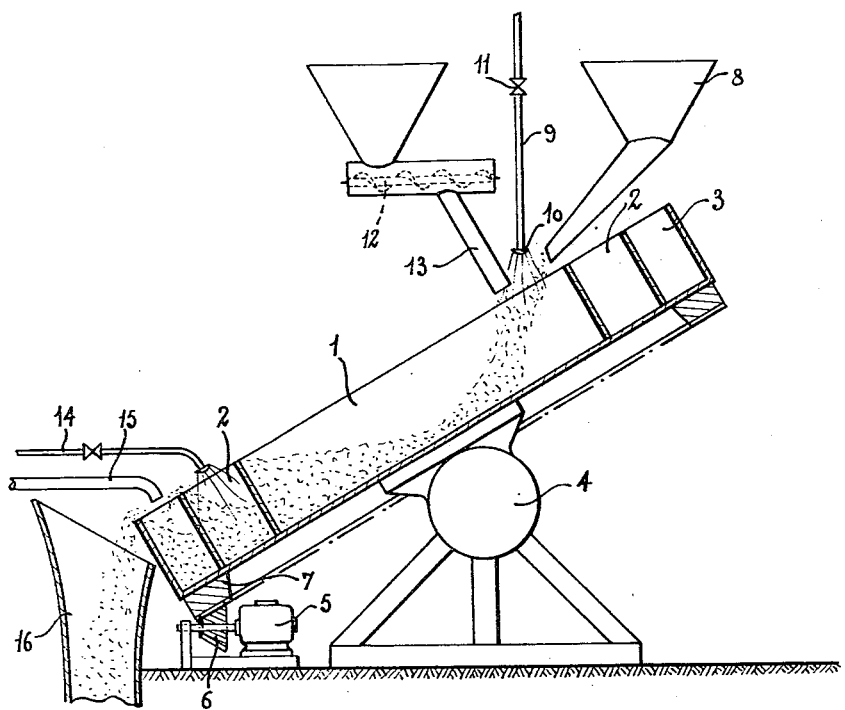
INVENTOR
JEAN-BAPTISTE CESCAS
By Irwin S. Thompson
ATTY.

2,999,336
PREPARATION OF COATED SEEDS

Jean-Baptiste Cescas, Paris, France, assignor to Compagnie Nord-Africaine de l'Hyperphosphate Reno, Sfax, Tunisia, a corporation of Tunisia
Filed July 23, 1959, Ser. No. 829,045
Claims priority, application France Aug. 9, 1958
4 Claims. (Cl. 47—58)

It is known that in order to improve the growth of plants and in particular of cereals such as wheat, rice, maize, etc., it is an advantage to prepare the seeds before they are sown by coating them with a substance containing elements which assist their growth and which the germ finds in situ at the time of its formation. These elements are determined according to the plant and according to the nature of the ground in which the seed is sown.

The elements in question consist of various fertilizers, powdered manure, plaster, etc.

In order to carry out the coating of the seeds with these elements, a known method consists in moistening the elements so that they adhere to the seeds and in producing coated seeds in the form of granules. This granulation is obtained in various devices such as a pelleting device, rotating drum or helicoidal passage.

The present invention has for its object a method of treatment of granules which improves the qualities of the products obtained.

This method is characterised in that concentrated sulphuric acid is projected on to the formed granules.

When the sulphuric acid having a concentration of 60° Baumé for example is added to the coating elements, it ensures their agglomeration and their adhesion to the seed.

When projected on the granules, sulphuric acid has a double effect: it produces with the coating elements an exothermic reaction which in turn has the effect of drying the formed granules and secondly, forms on the granules a hard and tough surface layer which assists the stability of said granules.

In order to constitute the coating, all powdered fertilizers can be employed such as natural or chemical phosphates, nitrogenous and potash products, etc. The choice of fertilizer will be determined by the complementary agents to be added to the soil for which the seeds are intended. These products, either simple or compound fertilizers, are reduced to a sufficiently fine granular size corresponding to a size of mesh of 80/100 or of that order.

According to the case, there can be associated with the powdered fertilizer such porous materials as diatomaceous earth or kieselguhr, for example, which have the effect of making the coating porous and thus more permeable to the humidity of the ground.

During the granulation treatment, various other compounds can be introduced in the coating so as to co-operate subsequently in the development of the seed and of the plant. Thus in one particular application, ammonia can be sprayed in to the granules and by the reaction of the ammonia with the fertilizer, the nitrogen content of the fertilizer is enriched. This reaction which is exothermic also contributes to the drying of the granules. All kinds of oligo-elements which are recognized as favourable or useful to the development of the plant can also be added.

Finally, it is an advantage to add pigments or dyes which dye the coating and enable the seeds concealed beneath said coating to be identified.

After the granules have been formed, they can be subjected to complementary treatments.

For example, by rolling the granules in a fine powder such as hyper-phosphate, they are given a whitish external aspect and this addition completes the drying effect. Or else a solution of sodium silicate is projected on the granules, which results in the formation of a hard external layer which is an advantage for handling purposes.

The practical operation of the method is carried out with profitable efficiency in an installation of the type shown in the single figure of the attached drawings.

This installation is composed of a rotary granulator of the usual tray type. This granulator comprises a central portion 1 and two successively arranged lateral and concentric annular members 2 and 3. The unit is pivotally mounted on a support 4. This latter is arranged so as to give the plate 1—2—3 the desired angle of slope, which is generally between 45° and 48°. The plate is driven by a reducing motor 5 driving a toothed pinion 6 which engages a toothed ring 7 rigidly fixed to the tray. Any other driving device can be provided.

Arranged above the granulator are: the seed supply 8, an admission 9 of water or of a wetting solution terminating in one or a number of sprinklers 10 and adjustable by means of the fluid-cock 11, a screw-type distributor 12 for conveying fertilizer into a spout 13. The input pipe for sulphuric acid at 14 opens into the annular member 2. A conduit 15 conveys into the external annular member 3 either fertilizer or like material of fine powder such as hyperphosphate, while 16 represents the spout for the evacuation of the formed granules: this latter could be replaced by a conveyor belt or any like means of handling said granules.

It can be understood that when the plate 1, 2, 3 is in continuous rotation, the seeds conveyed through 8 into the central portion 1 of the granulator are moistened by the spraying of the liquid 10. The fertilizer which comes from 12 and 13 is shaken on to the wetted seeds. The fertilizer powder is agglomerated with the seeds to form an adhesive coating. This coating of fertilizer can reach three to seven times the weight of the seed.

The granules thus formed pass into the annular member 2 and then receive an addition of concentrated sulphuric acid coming from 14 in a determined proportion. In practice the quantity of acid employed is from 3 to 5% of the weight of the granules. This addition of acid causes rapid heating with partial evaporation of the water of the granules. The granules thus partially dried pass into the annular member 15 in which they receive an addition of finely powdered fertilizer corresponding to mesh 300. There is thus formed an external coating of this fertilizer which absorbs the residual humidity. The powder which is thus conveyed into the annular member 3 can be dyed so as to impart an identification color to the granules. These granules then fall into the spout 16 which conveys them to storage or to utilization.

The rate of production of the sloping granulator described above can vary according to the speed of delivery of the materials introduced and the speed of rotation of the tray.

What I claim is:

1. A method of preparation of seeds provided with a coating of fertilizer material comprising the steps of introducing seeds to be coated into a granulating device, applying liquid in a fine spray to said seeds to moisten the surface thereof, adding fertilizer material in a fine powdered form to the moistened seeds for coating the moistened surface of said seeds with said fertilizer material in a proportion of three to seven times the weight of said seeds, and further treating the coated seeds with concentrated sulphuric acid which is from 3 to 5% of the weight of said coated seeds to simultaneously dry and set the coating on said coated seeds by the exothermic reaction of the sulphuric acid with the fertilizer material.

2. A method according to claim 1 which further comprises the step of spraying ammonia onto said coated seeds prior to ading the concentrated sulphuric acid to enrich the nitrogen content of said fertilizer material and to provide an incipient drying effect on said coated seeds.

3. A method according to claim 1 which further comprises the step of adding an additional external coating of finely powdered material of the order of 300 mesh to said coated seeds immediately after addition of said sulphuric acid, which external coating absorbs the residual humidity.

4. A method according to claim 3 in which there is added to said additional finely powdered material dye material to enable the seeds concealed beneath the coated material to be identified.

References Cited in the file of this patent

UNITED STATES PATENTS

| | | |
|---|---|---|
| 2,579,733 | Burgesser | Dec. 25, 1951 |
| 2,651,883 | Hedrick et al. | Sept. 15, 1953 |
| 2,739,886 | Facer | Mar. 27, 1956 |